United States Patent
Binder

(10) Patent No.: US 8,894,382 B2
(45) Date of Patent: Nov. 25, 2014

(54) HANDHELD BLOWER APPARATUS

(75) Inventor: Andreas Binder, Stuttgart (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 131 days.

(21) Appl. No.: 13/245,053

(22) Filed: Sep. 26, 2011

(65) Prior Publication Data

US 2012/0076672 A1 Mar. 29, 2012

(30) Foreign Application Priority Data

Sep. 27, 2010 (DE) .......................... 10 2010 046 565

(51) Int. Cl.
*F04D 25/06* (2006.01)
*F04D 29/60* (2006.01)
*H02K 16/00* (2006.01)
*H02K 9/06* (2006.01)
*F04D 25/08* (2006.01)
*H02K 7/00* (2006.01)
*H02K 1/18* (2006.01)
*H02K 7/14* (2006.01)
*H02K 5/18* (2006.01)

(52) U.S. Cl.
CPC .............. *F04D 25/064* (2013.01); *H02K 16/00* (2013.01); *F04D 25/0646* (2013.01); *H02K 9/06* (2013.01); *F04D 25/084* (2013.01); *H02K 7/003* (2013.01); *H02K 1/187* (2013.01); *H02K 7/145* (2013.01); *H02K 5/18* (2013.01)
USPC ......... 417/234; 417/423.15; 310/50; 310/191

(58) Field of Classification Search
USPC ................... 417/234, 359, 361, 423.6, 423.7, 417/423.15, 423.12, 423.14; 310/47, 50, 310/191
See application file for complete search history.

(56) References Cited

U.S. PATENT DOCUMENTS

| | | | | |
|---|---|---|---|---|
| 2,753,434 A * | 7/1956 | Storm, Jr. | ......................... | 55/467 |
| 4,884,314 A * | 12/1989 | Miner et al. | ..................... | 15/344 |
| 6,791,221 B1 * | 9/2004 | Lan | ................................. | 310/89 |
| 7,402,929 B1 * | 7/2008 | Dilliner | ......................... | 310/152 |

* cited by examiner

*Primary Examiner* — Bryan Lettman
(74) *Attorney, Agent, or Firm* — Walter Ottesen, P.A.

(57) ABSTRACT

A handheld blower apparatus includes a housing (2), an axial blower (6) which conveys air through a blower tube (7), and an electric drive motor (4). The drive motor (4) has a rotor (22) and a stator (21) and rotatably drives a drive shaft (16) and at least one fan wheel (23) of the axial blower (6). A simple construction results when the drive shaft (16) is rotatably mounted in the housing (2), when the rotor (22) of the drive motor (4) is connected to the drive shaft (16) in a rotatably fixed manner and the stator (21) of the drive motor (4) is rotatably mounted on the drive shaft (16). The stator (21) is supported relative to the housing (2) to prevent rotation and can tilt in a limited manner relative to the housing (2).

14 Claims, 4 Drawing Sheets

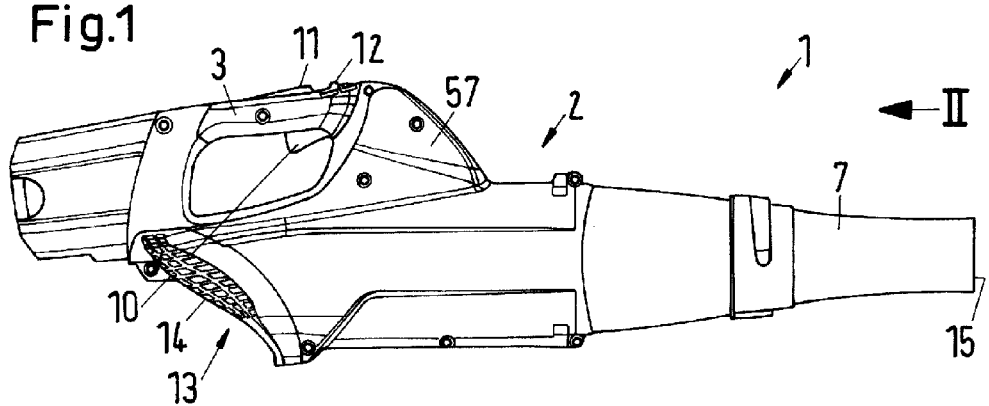
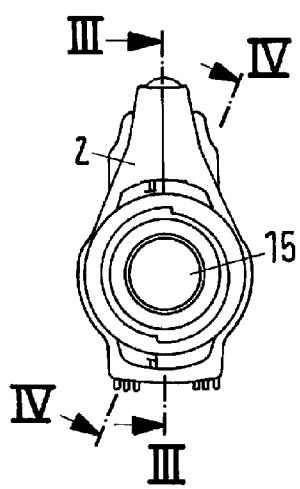
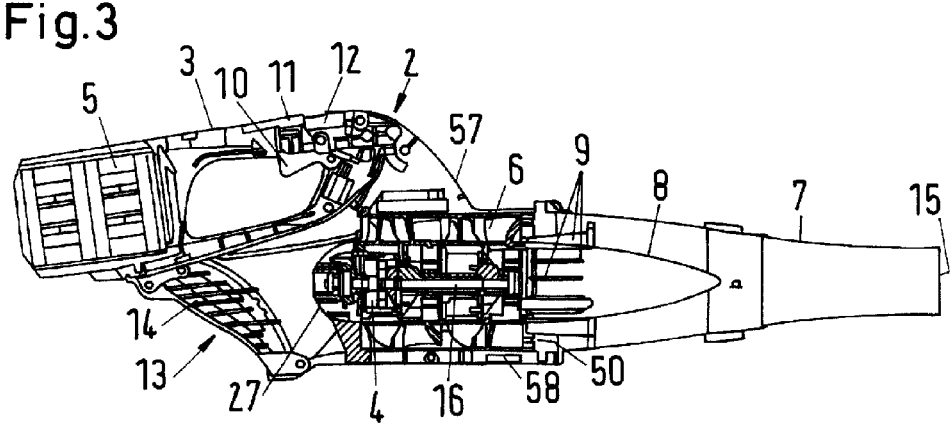

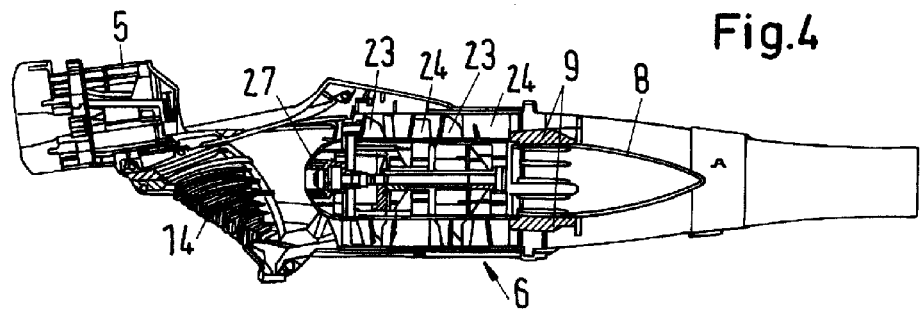
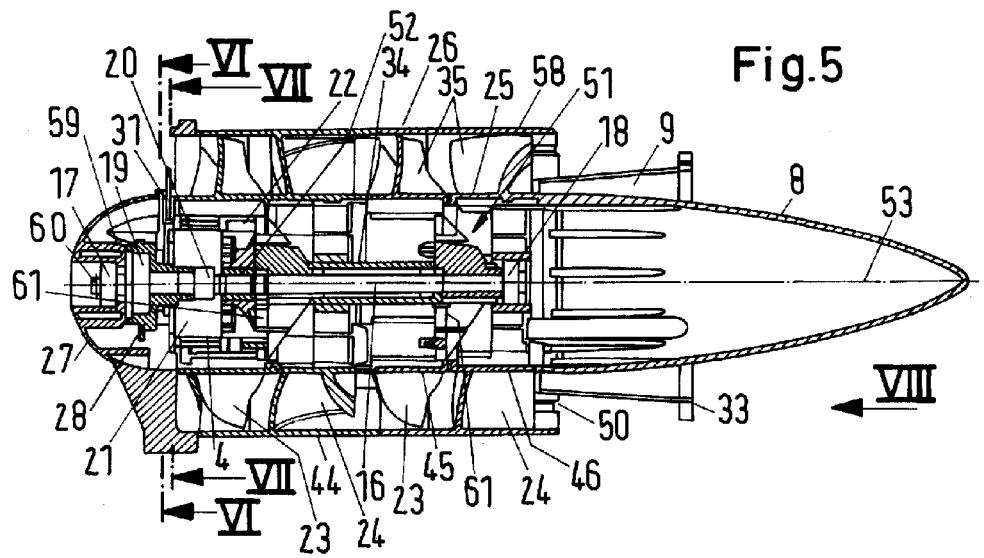
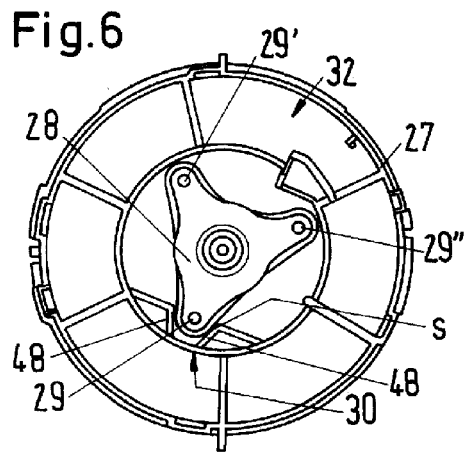
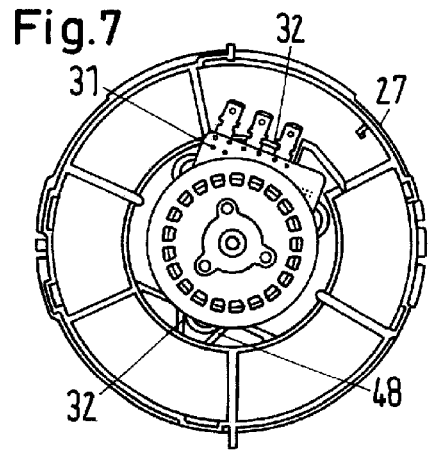

HANDHELD BLOWER APPARATUS

CROSS REFERENCE TO RELATED APPLICATION

This application claims priority of German patent application no. 10 2010 046 565.8, filed Sep. 27, 2010, the entire content of which is incorporated herein by reference.

FIELD OF THE INVENTION

The invention relates to a handheld blower apparatus.

BACKGROUND OF THE INVENTION

U.S. Pat. No. 4,884,314 discloses a blower apparatus which has a single-stage axial fan. An electric motor configured as an internal rotor motor serves to drive the fan wheel. The motor is fixed to the housing at the motor's outer side. The fan wheel is fixed directly on the drive shaft of the motor.

SUMMARY OF THE INVENTION

It is an object of the invention to provide a handheld blower apparatus having an alternative configuration.

The handheld blower apparatus of the invention includes: a housing and a blower tube connected to the housing; an axial blower having at least one fan wheel for moving air through the blower tube; an electric drive motor having a rotor and a stator; a drive shaft rotatably mounted in the housing and configured to be rotatably driven by the electric drive motor; the fan wheel being configured to be rotatably driven by the electric drive motor; the rotor of the electric drive motor being fixedly connected to the drive shaft so as to cause the drive shaft to rotate therewith; the stator of the electric drive motor being rotatably mounted on the drive shaft; and, the stator being supported relative to the housing so as to prevent a rotation of the stator relative to the housing and being movable in at least one direction.

The motor is mounted on the drive shaft which, in turn, is rotatably mounted in the housing of the blower apparatus. A direct mounting of the motor in the housing can thus be omitted. The stator of the motor supports itself only relative to the housing counter to the direction of rotation. The support need only ensure that the stator cannot rotate with the rotor so that there are no special requirements made with respect to the support in terms of precision. Because the stator is movable in at least one direction in relation to the housing, manufacturing tolerances can be compensated, and distortion of the drive shaft and of the stator in the housing is avoided. The position securing of the stator in the at least one direction is advantageously done via the drive shaft so that the stator is arranged essentially stationary in the housing after assembly. The movability of the stator in relation to the housing before the assembly of the drive shaft can be a translational and/or a rotatory movability.

Advantageously, the stator can also tilt in relation to the housing. Because a tilting of the stator in relation to the housing is possible, tolerances can be compensated, and distortion of the drive motor as a result of small errors in the alignment of the drive shaft and stator support is avoided. In this connection, the tilt motion occurs about an axis which is perpendicular to the rotational axis of the axial blower. In particular, the movability is limited. Advantageously, the maximum possible movability, especially the maximum possible tilted position of the stator, is chosen in such a manner that all occurring manufacturing tolerances can be compensated. In particular, the stator is supported exclusively against rotation relative to the housing and in all other directions it is movable. Thus, both movements of the stator in relation to the housing in all three spatial directions and rotational movements about all spatial axes perpendicular to the rotational axis are possible.

A simple configuration results when the motor has a connecting flange which is connected to the stator. The connecting flange is supported in a rotational fixed manner in the housing. In particular, the connecting flange has an eyelet which is typically used to threadably engage and fix the stator on the housing. For the blower apparatus, it is provided that the eyelet, which is already present on known external rotor motors, projects between two wall sections of the housing and is thus fixed in its rotational position. The fixation counter to the direction of rotation can be done with or without play. Corresponding wall sections of the housing are configured especially as one piece with a housing section so that a simple design results.

For the mounting of the drive shaft, it is provided that a first bearing of the drive shaft is arranged adjacent to the drive motor and configured as a fixed bearing. A second bearing of the drive shaft is, in particular, arranged adjacent to the blower outlet and is configured as a floating bearing.

For the cooling of the motor, it is provided that the rotor has blower ribs which extend on the periphery and on the forward side of the rotor which faces the axial blower. In order to provide a rotationally fixed connection between the fan wheel and the rotor in a simple manner, the fan wheel has at least one entraining projection which projects between two blower ribs of the rotor. In this way, a very simple configuration of the rotationally fixed connection between the fan wheel and the rotor is achieved. Because the rotationally fixed connection is not made adjacent to the rotational axis of the drive shaft but is made radially comparatively far outwards on the blower ribs, high torques can be transferred with a simple configuration of the connection.

Advantageously, the blower has an outer wall and an inner wall. The inner wall delimits, in particular, an interior space in which the drive shaft is arranged. The blower blades are advantageously arranged in the annular space between the inner wall and the outer wall. A simple, compact configuration results when the drive motor is arranged in the interior space. In this way, the drive motor is arranged in particular in the first blower stage of the axial blower arranged upstream, advantageously in the fan wheel of the first blower stage. In particular, the axial blower has multiple guide wheels and multiple fan wheels. In order to prevent any moved air from flowing back via the interior space of the axial blower, the inner wall of the axial blower should be configured as seal tight as possible. For this, an inner wall section is formed on each guide wheel and on each fan wheel. Adjacent inner wall sections advantageously overlap so that a labyrinth-like sealing between the inner wall sections is achieved. Thus, any back flow of air in the interior space can for the most part be avoided despite the gaps required on the interior wall because of the relative movement of the guide wheels and fan wheels. An outer wall section is advantageously formed on the guide wheels. The outer wall sections of the guide wheels, in particular, foam an essentially continuous outer wall of the axial blower. The fan wheels which are each arranged upstream of the guide wheels accordingly have no outer wall sections so that the outer wall is formed exclusively by the guide wheels. Thus, a simple configuration results. Because the outer wall does not rotate during operation, it can be fixedly connected to the outer housing. The fan wheels and the guide wheels are advantageously configured as standard parts.

In order to achieve a high performance, the blower has a multi-stage configuration and has at least two fan wheels. Advantageously, the fan wheels are connected to each other in a form-fitting manner. A simple constructional configuration results when a sleeve is provided for the form-fitting connection of the fan wheels. The sleeve surrounds the drive shaft and with its ends engages in mutually adjacent fan wheels. The form-fitting connection via the sleeve can be realized with simple means. A form-fitting connection between the drive shaft and the fan wheels can be omitted as a result so that a simple configuration results.

Advantageously, the axial blower has an outlet cone on which flow guiding ribs are arranged. The flow guiding ribs on the outlet cone ensure a steady flow and lead to an improvement of the efficiency of the axial blower apparatus. The flow guiding ribs also serve as a safety guard so that the operator is constructively prevented from reaching with the hands into the axial blower through the flow guiding ribs, and no further measures must be taken for this.

In particular, the drive motor is an external rotor motor thereby providing a simple configuration.

BRIEF DESCRIPTION OF THE DRAWINGS

The invention will now be described with reference to the drawings wherein:

FIG. 1 is a side view of a blower apparatus;

FIG. 2 is a side view in the direction of the arrow II of FIG. 1;

FIG. 3 shows a section along the line of FIG. 2;

FIG. 4 shows a section along the line IV-IV of FIG. 2;

FIG. 5 is an enlarged view of the axial blower of FIG. 3;

FIG. 6 shows a section along the line VI-VI of FIG. 5;

FIG. 7 shows a section along line VII-VII of FIG. 6;

DESCRIPTION OF THE PREFERRED EMBODIMENTS OF THE INVENTION

Figure 8:
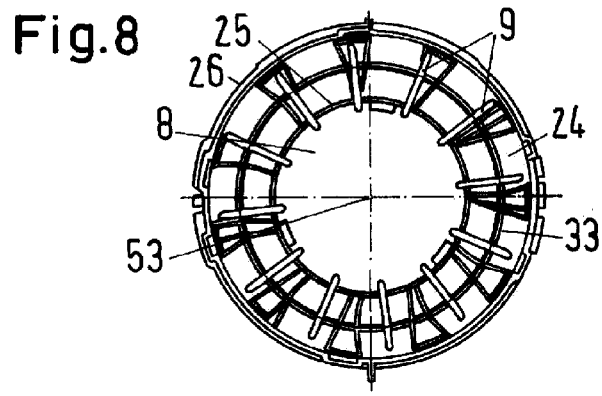
FIG. 8 is a side view onto the axial blower in the direction of arrow VIII of FIG. 5.

FIG. 1 shows a handheld blower apparatus 1 which has a housing 2. The housing 2 has an outer housing 57 on which a handle 3 is formed. An operating lever 10, an operating lever lock 11, and a slider 12 are arranged on the handle 3. The blower apparatus 1 has a blower tube 7 having an air outlet opening 15 through which working air is blown out during operation. The air is drawn in via an air inlet opening 13 which is arranged in an area below the handle 3 and is covered by a grid 14. The air outlet opening 15 is also shown in FIG. 2.

As FIG. 3 shows, a battery 5, which supplies a drive motor 4 of the blower apparatus 1 with power, is arranged adjacent to the handle 3. An axial blower 6, which conveys the air flow from the air inlet opening 13 to the air outlet opening 15, is arranged in the housing 2. The axial blower 6 is arranged in an inner housing 58 which forms a portion of the housing 2 and which is held in the outer housing 57 in a form-fitting manner. An air inlet cover 27, which is curved in the direction of the air inlet opening 13 and which covers the drive motor 4, is arranged on the side of the axial blower 6 which faces the air inlet opening 13. The drive motor 4 rotationally drives a drive shaft 16. An outlet cone 8 which projects in the direction of the blower tube 7 is arranged at the blower output 50. A plurality of flow guiding ribs 9 are provided on the outer periphery of the outlet cone 8. The air inlet cover 27 and the outlet cone 8 form parts of the inner housing 58.

The flow guiding ribs 9 are shown in FIG. 4. As FIG. 4 also shows, the axial blower 6 is designed multi-staged, namely two-staged, and has two rotatingly driven fan wheels 23 and two fixed guide wheels 24 which are arranged alternately and one behind the other.

FIG. 5 shows the configuration of the axial blower 6 in detail. The drive shaft 16 is mounted on the air inlet cover 27 with a first bearing 17 and, adjacent to the blower output 50, with a second bearing 18. The second bearing 18 supports the drive shaft 16 relative to the guide wheel 24 arranged downstream. The first bearing 17 is configured as a fixed bearing and the second bearing 18 is configured as a floating bearing.

The drive motor 4 has a stator 21 and a rotor 22. The rotor 22 is connected to the drive shaft 16 in a rotationally fixed manner at a connection 52. The stator 21 situated inside is rotatably mounted on the drive shaft 16 via a first bearing 19 and a second bearing 20, so that the drive shaft 16 with the rotor 22 can rotate relative to the stator 21. The first bearing 19 is arranged in a connecting flange 28 of the stator 21. The second bearing 20 is advantageously configured as a needle bearing and is arranged in the area of the windings of the stator 21. A control board 31, which triggers the drive motor 4 that is advantageously electronically commutated, is arranged in the region between the connecting flange 28 and the stator 21. The drive motor 4 supports itself in the axial direction with the connecting flange 28 on an edge 59 formed on the air inlet cover 27. In the opposite direction, the fixation is done via a securing ring 60 which is arranged on the drive shaft 16 and which supports itself on the first bearing 17 of the drive shaft 16. The support of the stator 21 is configured so that the stator 21 cannot rotate along but can slightly tilt relative to the housing 2 about an axis perpendicular to the rotational axis 53. Because of the long length of the drive shaft 16 and the given manufacturing tolerances, the drive shaft 16 can be arranged slightly tilted in the housing 2. Exact aligning of the bearings 17 and 18 of the drive shaft 16 is only possible with considerable effort. Because the stator 21 is not fixedly clamped but can also tilt slightly, distortion of the drive motor 4 in the housing 2 is avoided. The final position securing of the stator 21 is done with the bearings 17 and 18 via the drive shaft 16. Additionally, the supporting of the stator 21 allows a limited movement of the stator 21 in the longitudinal direction of the drive shaft 16, because a small play is given via the securing ring 60. Also perpendicularly to the drive shaft 16, the stator 21 is advantageously movable in a limited manner relative to the housing 2. This can be done by correspondingly selecting the inner dimensions of the air inlet cover 27.

The drive shaft 16 is arranged in an inner space 51 of the axial blower 6 which is surrounded by an inner wall 25. The inner wall 25 is formed by the adjacent inner wall sections 45 of the fan wheels 23 and the inner wall sections 46 of the guide wheels 24. The inner wall 25 separates the inner space 51 from the annular space delimited by the inner wall 25 and an outer wall 26. The blower blades 35 of the fan wheels 23 and guide wheels 24 are arranged in the annular space. The outer wall 26 is formed by two outer wall sections 44 which are fixedly connected to the guide wheels 24 and in particular are formed thereon. The outer wall 26 forms a part of the inner housing 58 of the blower apparatus 1. Advantageously, the guide wheels 24 and the fan wheels 23 are made of plastic, and the inner wall sections 45 and 46 as well as the outer wall sections 44 are formed on the fan wheels 23 and the guide wheels 24, respectively. As FIG. 5 shows, the drive motor 4 is arranged in the inner space 51, that is in the area of the first blower stage, in particular, within the fan wheel 23 of the axial blower 6 situated upstream.

The two fan wheels 23 are connected to each other in a rotatably fixed manner via a connecting sleeve 34. The connecting sleeve 34 is arranged in the inner space 51 and surrounds the drive shaft 16.

The connecting flange 28 is supported on the air inlet cover 27 to secure the rotational position of the stator 21. As FIG. 6 shows, the connecting flange 28 has three eyelets (29, 29', 29") which project radially outward. As FIG. 6 shows, the eyelet 29 projects into a receiver 30 formed between the wall sections 48. Wall sections 48 of the air inlet cover 27 are arranged on an eyelet 29 on both sides situated in circumferential direction. The eyelet 29 is advantageously held between the wall sections 48 with play, so that a tolerance-insensitive arrangement results. For this, the distance(s) can be formed between the eyelet 29 and a wall section 48. The stator 21 is thus supported on the housing 2 via the connecting flange 28 and the air inlet cover 27 which forms part of the housing 2. The air inlet cover 27 has a recess 32 on its outer periphery, through which recess the control board 31 passes to the outside. This is shown in FIG. 7.

FIG. 8 shows in detail the configuration of the flow guiding ribs 9 on the output cone 8. A plurality of flow guiding ribs 9, which extend evenly distributed on the periphery of the output cone 8 in the radial direction to the rotational axis 53 of the axial blower 6, are provided. As FIG. 8 also shows, the flow guiding ribs 9 extend over nearly the entire annular space between the inner wall 25 and the outer wall 26. As FIG. 8 shows, the flow guiding ribs 9 are connected to each other via a reinforcing ring 33. The flow guiding ribs 9 form a safety guard. They ensure that an operator cannot reach into the axial blower 6 via the blower tube 7.

Figure 9:
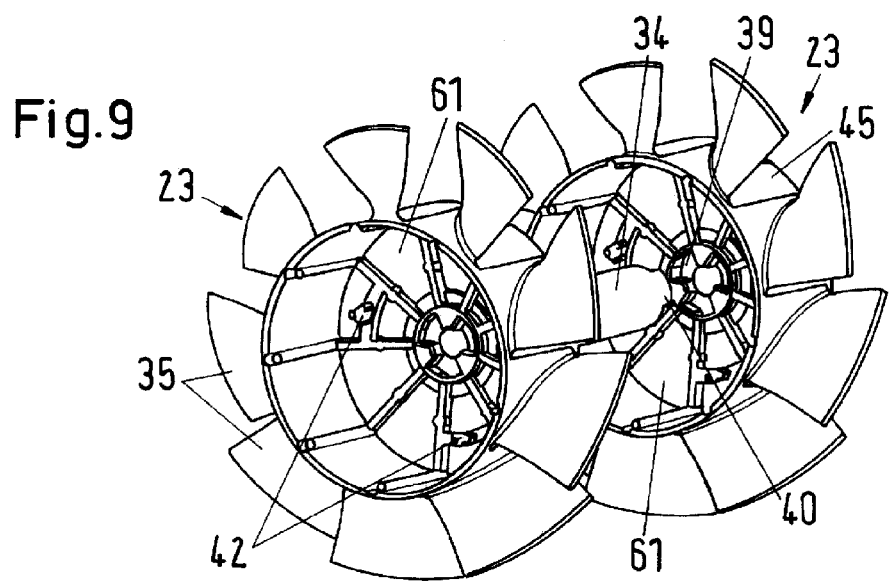
FIG. 9 is a perspective exploded view of the fan wheel of the axial blower.
Figure 10:
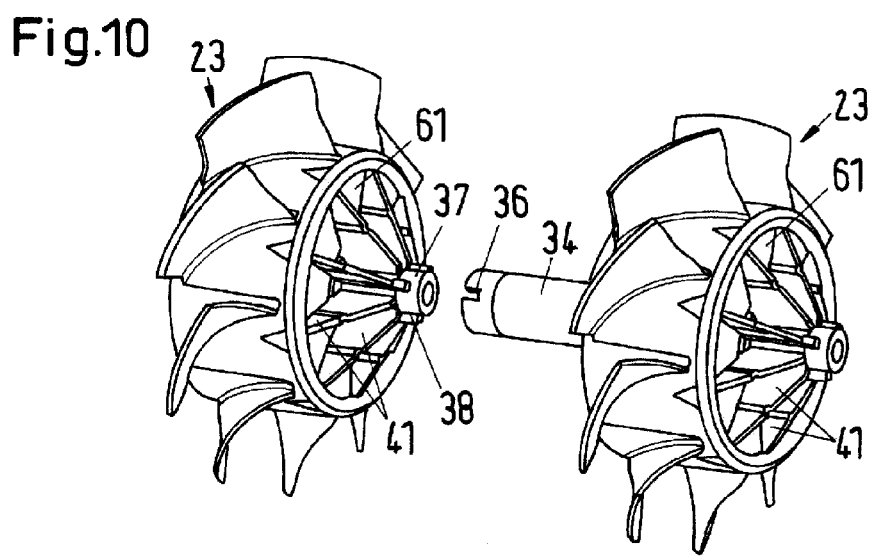
FIG. 10 is a perspective exploded view of the fan wheels of the axial blower.

In order to achieve a simple construction, the two fan wheels 23 and the two guide wheels 24 are each configured identical to one another. Thus, the number of required different individual parts is reduced. FIGS. 9 and 10 show in detail the two fan wheels 23 and the connecting sleeve 34. On the end which faces away from the drive motor 4, the connecting sleeve 34 has entraining cams 40 which project into corresponding recesses 39 of the adjacent fan wheel 23. FIG. 9 also shows entraining projections 42 which are arranged on the side of the fan wheel 23 which faces the drive motor 4 and whose function will be described in more detail below. The fan wheels 23 each have an intermediate wall 61 which extends approximately perpendicular to the rotational axis 53. The intermediate walls 61 divide the inner space 51 into sections, as also shown in FIG. 5, and thereby prevent back flowing of the conveyed air to the drive motor 4 via the inner space 51.

On the end facing the drive motor 4 the connecting sleeve 34 has the slot 36 shown in FIG. 10, which is pushed over a lug 38 on the fan wheel 23. A total of three slots 36 are provided distributed over the periphery. The lugs 38 are formed on an inner stud 37 of the fan wheel 23. The connecting sleeve 34 is thus connected to both fan wheels 23 in rotational direction in a form-fitting manner.

Figure 11:
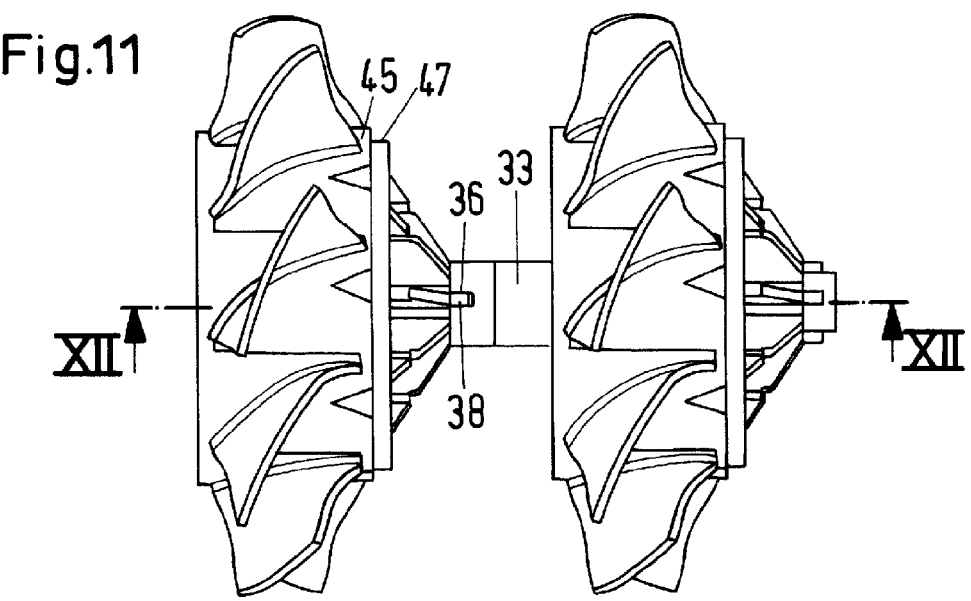
FIG. 11 is a side view of the fan wheels.
Figure 12:
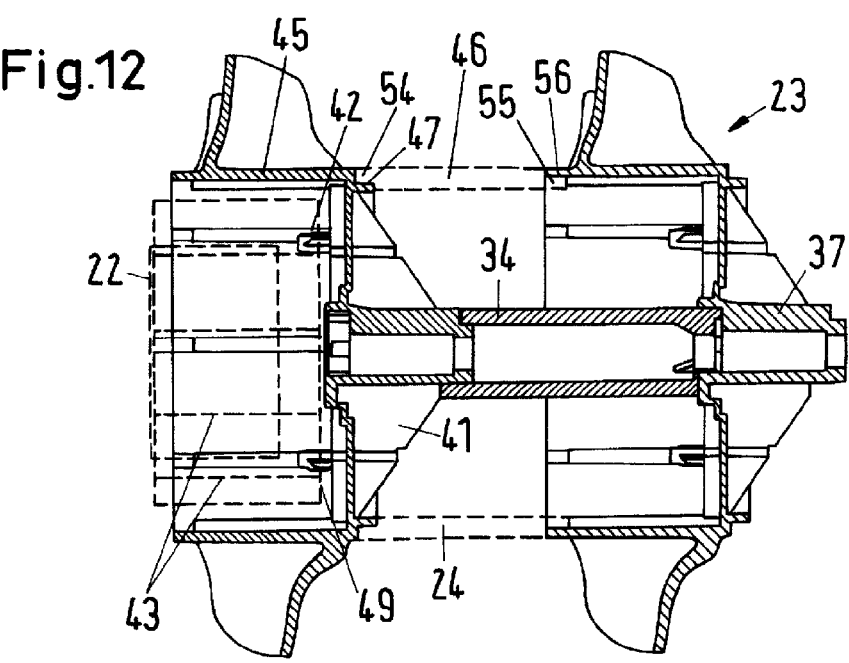
FIG. 12 shows a section along the line XII-XII of FIG. 11.

As FIG. 11 shows, a ledge 47 is formed on each inner wall section 45 of the fan wheels 23 on the side which faces away from the drive motor 4. As FIG. 12 schematically shows, a wall section 54 of the adjacent guide wheel 24 projects into the ledge 47. As a result of this overlapping of the inner wall sections 45 and 46, a labyrinth-like sealing of the inner space 51 is achieved. On the side facing away from the drive motor, the guide wheel 24, shown only schematically in FIG. 12, has a corresponding ledge 55 in which projects a wall section 56 of the fan wheel 23. Thus, substantial sealing of the inner space 51 is achieved relative to the annular space formed between the inner wall 25 and the outer wall 26. The air flowing into the inner space 51 via the remaining leaks is prevented from flowing back into the drive motor 4 via the intermediate walls 61 to a large extent.

As FIG. 12 also shows, radially outward aligned ribs 41 are provided on the exterior of the stud 37, which ribs serve the purpose of connecting the stud 37 with the inner wall section 45 and the purpose of reinforcement.

Figure 13:
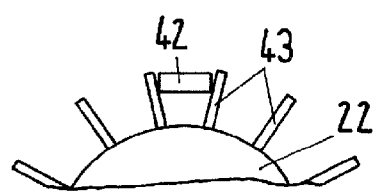
FIG. 13 is a schematic of the rotor of the drive motor and an entraining projection of a fan wheel.

The rotor 22, schematically shown in FIG. 12, has a plurality of blower ribs 43 on its outer periphery and on its front end 49 which faces the fan wheel 23. As FIG. 13 shows schematically, the entraining projection 42 of the fan wheel 23 projects between, two adjacent blower ribs 43. Thus, a rotationally fixed connection between the rotor 22 and the fan wheel 23 is achieved.

It is understood that the foregoing description is that of the preferred embodiments of the invention and that various changes and modifications may be made thereto without departing from the spirit and scope of the invention as defined in the appended claims.

What is claimed is:

1. A handheld blower apparatus comprising:
a housing and a blower tube connected to said housing;
an axial blower having at least one fan wheel for moving air through said blower tube;
an electric drive motor having a rotor and a stator;
a drive shaft rotatably mounted in said housing and configured to be rotatably driven by said electric drive motor;
said at least one fan wheel being configured to be rotatably driven by said electric drive motor;
said rotor of said electric drive motor being fixedly connected to said drive shaft so as to cause said drive shaft to rotate therewith;
said stator of said electric drive motor being rotatably mounted on said drive shaft;
said stator being supported relative to said housing so as to prevent a rotation of said stator relative to said housing and being movable in at least one direction relative to said housing;
said drive motor having a connecting flange;
said connecting flange being connected to said stator and being supported on said housing so as to prevent a rotation of said flange relative to said housing;
said housing having two wall sections;
said connecting flange having an eyelet which projects between said two wall sections; and,
said wall sections supporting said eyelet preventing said rotation.

2. A handheld blower apparatus comprising:
a housing and a blower tube connected to said housing;
an axial blower having at least one fan wheel for moving air through said blower tube;
an electric drive motor having a rotor and a stator;
a drive shaft rotatably mounted in said housing and configured to be rotatably driven by said electric drive motor;
said at least one fan wheel being configured to be rotatably driven by said electric drive motor;

said rotor of said electric drive motor being fixedly connected to said drive shaft so as to cause said drive shaft to rotate therewith;
said stator of said electric drive motor being rotatably mounted on said drive shaft;
said stator being supported relative to said housing so as to prevent a rotation of said stator relative to said housing and being movable in at least one direction relative to said housing; and,
said rotor having blower ribs which extend on a periphery and on a forward end of said rotor which faces said axial blower.

3. The blower apparatus of claim 2, wherein said fan wheel has at least one entraining projection which projects between two of said blower ribs of said rotor.

4. A handheld blower apparatus comprising:
a housing and a blower tube connected to said housing;
an axial blower having at least one fan wheel for moving air through said blower tube;
an electric drive motor having a rotor and a stator;
a drive shaft rotatably mounted in said housing and configured to be rotatably driven by said electric drive motor;
said at least one fan wheel being configured to be rotatably driven by said electric drive motor;
said rotor of said electric drive motor being fixedly connected to said drive shaft so as to cause said drive shaft to rotate therewith;
said stator of said electric drive motor being rotatably mounted on said drive shaft;
said stator being supported relative to said housing so as to prevent a rotation of said stator relative to said housing and being movable in at least one direction relative to said housing;
said axial blower having an outer wall and an inner wall;
said inner wall delimiting an interior space;
said drive shaft being arranged in said interior space;
said inner wall and said outer wall conjointly defining an annular space therebetween; and,
said at least one fan wheel having blower vanes which are arranged in said annular space.

5. The blower apparatus of claim 4, wherein said drive motor is arranged in said interior space.

6. The blower apparatus of claim 5, wherein said axial blower has a plurality of guide wheels and a plurality of said fan wheels.

7. The blower apparatus of claim 6, wherein each of said plurality of guide wheels and each of said plurality of fan wheels has an inner wall section formed thereon and adjacent ones of said inner wall sections overlap.

8. The blower apparatus of claim 6, wherein:
said guide wheels each have an outer wall section formed thereon; and,
the outer wall sections of said guide wheels form a substantially continuous outer wall of said axial blower.

9. The blower apparatus of claim 4, wherein:
said axial blower has at least two fan wheels; and,
said fan wheels are connected to each other in a form-fitting manner.

10. The blower apparatus of claim 9, further comprising:
a connecting sleeve configured for the form-fitting connection of said fan wheels;
said connecting sleeve having two ends and surrounding said drive shaft; and,
said ends of said connecting sleeve being configured to engage in corresponding ones of mutually adjacent fan wheels in a form-fitting manner.

11. The blower apparatus of claim 4, wherein:
said axial blower has a blower outlet and an outlet cone in the region of said blower outlet; and,
said outlet cone has flow guiding ribs arranged thereon.

12. A handheld blower apparatus comprising:
a housing and a blower tube connected to said housing;
an axial blower having at least one fan wheel for moving air through said blower tube;
an electric drive motor having a rotor and a stator;
a drive shaft rotatably mounted in said housing and configured to be rotatably driven by said electric drive motor;
said at least one fan wheel being configured to be rotatably driven by said electric drive motor;
said rotor of said electric drive motor being fixedly connected to said drive shaft so as to cause said drive shaft to rotate therewith;
said stator of said electric drive motor being rotatably mounted on said drive shaft;
said stator being supported relative to said housing so as to prevent a rotation of said stator relative to said housing and so as to be tiltable with respect to said housing;
bearings for mounting said drive shaft in said housing;
said stator having a position in said housing determined by said drive shaft and said mounting of said drive shaft in said housing so as to permit tolerances between alignment of the support of said stator relative to said housing and the mounting of said drive shaft in said housing to be at least partially compensated; and,
said drive motor being an external rotor motor.

13. The blower apparatus of claim 12, wherein the movement of said stator is limited.

14. The blower apparatus of claim 12, wherein:
said drive motor has a connecting flange; and,
said connecting flange is connected to said stator and is supported on said housing so as to prevent a rotation of said flange relative to said housing.

* * * * *

UNITED STATES PATENT AND TRADEMARK OFFICE
CERTIFICATE OF CORRECTION

PATENT NO. : 8,894,382 B2  
APPLICATION NO. : 13/245053  
DATED : November 25, 2014  
INVENTOR(S) : Andreas Binder Page 1 of 1

It is certified that error appears in the above-identified patent and that said Letters Patent is hereby corrected as shown below:

In the Specification

In column 3:  
Line 30: -- III-III -- should be added after "line".

Signed and Sealed this  
Twenty-fourth Day of March, 2015

Michelle K. Lee  
*Director of the United States Patent and Trademark Office*